No. 828,625. PATENTED AUG. 14, 1906.
J. P. OGG.
TONGS.
APPLICATION FILED DEC. 2, 1904.

WITNESSES.
J. R. Keller
G. C. Raymond

INVENTOR.
John P. Ogg,
By Kay, Totten & Winter
His Attys.

UNITED STATES PATENT OFFICE.

JOHN P. OGG, OF RILLTON, PENNSYLVANIA, ASSIGNOR OF ONE-THIRD TO KAY TOTTEN & WINTER, OF PITTSBURG, PENNSYLVANIA, A PARTNERSHIP.

TONGS.

No. 828,625.      Specification of Letters Patent.      Patented Aug. 14, 1906.

Application filed December 2, 1904. Serial No. 235,221.

*To all whom it may concern:*

Be it known that I, JOHN P. OGG, a resident of Rillton, in the county of Westmoreland and State of Pennsylvania, have invented a new and useful Improvement in Tongs; and I do hereby declare the following to be a full, clear, and exact description thereof.

My invention relates to tongs, and more especially to tongs for handling hot rivets.

Heretofore in the erection of structural steel work for buildings or in boiler-works and other places where rivets are employed it has been customary to handle the hot rivets by means of ordinary tongs which grasp the rivet at the shank. The grasping of the rivet by such tongs at the shank, which is round, makes the handling of the rivet and adjusting of the same in position for riveting very uncertain, as the rivet is liable to wabble or change its position when grasped by the tongs, so as to entirely slip therefrom or so as to make it inconvenient and difficult to insert it into the opening formed to receive it. This riveting is often done in positions where the party grasping the rivet is very much hampered in his movements, as in the case of the erection of sky-scrapers, so that it is often very difficult to seize the rivet and hold it properly for insertion in the opening.

The object of my invention is to provide a form of tongs by means of which hot rivets may be grasped and held securely, so that the shank always remains in one position, which enables the operator to insert it accurately into any opening wherever the same may be located.

To these ends my invention comprises, generally stated, spring-handle tongs having one arm with a straight bifurcated end adapted to engage the shank of the rivet, the other arm being curved at the end so as to correspond with the head of the rivet and bent so as to be adapted to enter the fork in the other arm of the tongs beyond the head of the rivet contained therein, so as to hold the rivet securely in position and prevent the wabbling or displacing of the rivet in handling it with said tongs.

To enable others skilled in the art to make and use my invention, I will describe the same more fully, referring to the accompanying drawings, in which—

Figure 1:
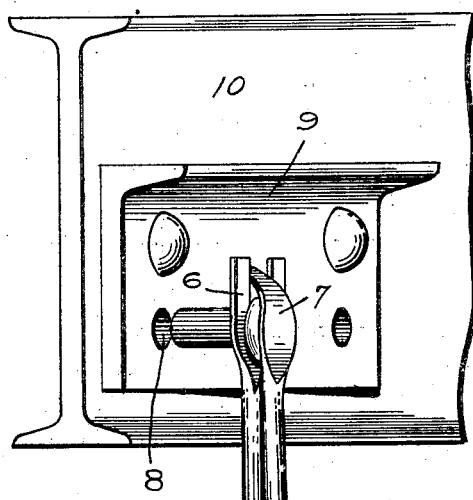
Figure 3:
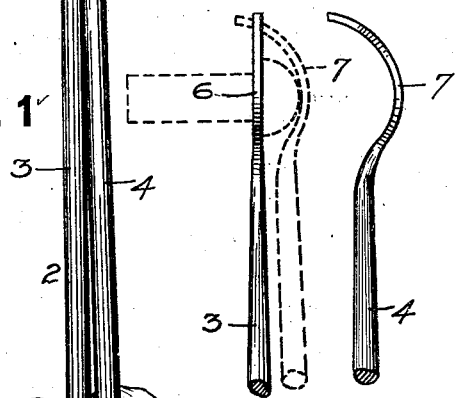
Figure 2:
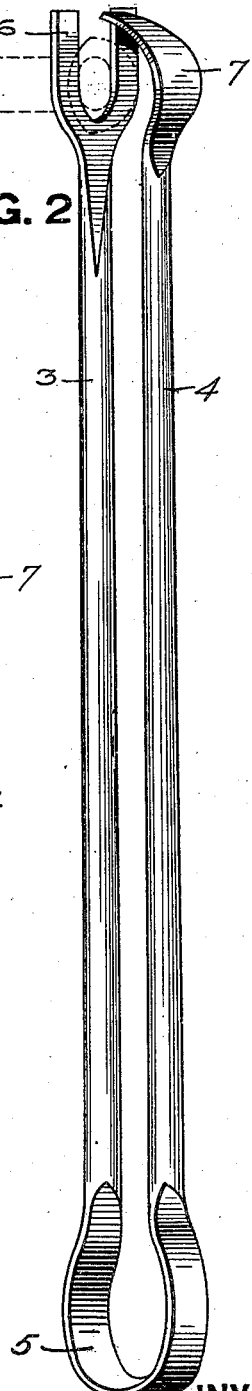

Figure 1 is a perspective view of my improved tongs with the rivet held therein in position for insertion into an opening to rivet two parts together. Fig. 2 is an enlarged perspective view of the tongs when open. Fig. 3 is a side view of the upper end of the tongs, the closed position being shown in dotted lines.

Like numerals indicate like parts in each of the figures.

In the drawings, the numeral 2 designates a suitable pair of tongs of the spring-handle type having the arms 3 and 4 connected by the spring-strap 5. The arm 3 of the tongs has the bifurcated end 6, while the arm 4 has the curved end portion 7, which is adapted to engage the head of the rivet, while the forward end of said curved portion is adapted to enter between the bifurcated end 6 of the arm 3. The shape of the end portion 7 may vary according to circumstances; but it is preferably curved to conform substantially with the rounded head of the rivet, while the end of said curved portion entering the bifurcated end of the arm 3 acts to prevent the rivet from slipping from said bifurcated end when the shaft of the rivet is engaged thereby.

When in use, the operator with the tongs in the open position thrusts the bifurcated end of the arm 3 into engagement with the shank of the rivet and then closes down with the arm 4, so that the end 7 engages the head of the rivet, as indicated in Fig. 1. By grasping the arms of the tongs, as indicated, the arms are closed and the rivet held securely in position, so that it may be inserted with accuracy into the opening to receive it—such, for instance, as the opening 8 in the angle 9, which is being riveted to the beam 10. The tongs and the rivet held thereby may be handled with equal facility in whatever position it is necessary to insert the rivet, whether from a point below or from any other direction, as there is no liability of the rivets slipping or dropping from the tongs. This is often a matter of great inconvenience in the erection of tall buildings or any place where hot rivets are employed, as the rivets are liable to drop from the tongs or to wabble around in different positions, so that it makes it difficult to insert them with accuracy into the opening made to receive them. By my invention, however, all this is avoided and it enables greater rapidity of work and dispenses with extra labor. These rivets are usually heated at the forge at some distance from the point of use and are generally tossed by the operator of the forge to the place where they are to be employed and are usually caught by the workman in some sort of receptacle, when they are picked from the receptacle by the tongs. With my improved tongs these rivets may be tossed from one point to another with equal facility by simply easing up on the tongs when about to toss the rivet.

What I claim is—

In tongs for handling rivets or like articles, one of the arms thereof having a bifurcated end adapted to engage the shank of the rivet, and the end of the other arm having a curved portion adapted to engage the head of the rivet and enter the space between the prongs of said bifurcated end beyond the head of said rivet.

In testimony whereof I, the said JOHN P. OGG, have hereunto set my hand.

JOHN P. OGG.

Witnesses:
JOHN C. FREDERICK,
D. L. FRICK.